US012104581B2

(12) United States Patent
Andersen et al.

(10) Patent No.: US 12,104,581 B2
(45) Date of Patent: Oct. 1, 2024

(54) METHOD OF REPAIRING A BEARING BORE AND BORE INSERT FOR REPAIRING A BEARING BORE

(71) Applicant: Vestas Wind Systems A/S, Aarhus N (DK)

(72) Inventors: Mogens E. Andersen, Ringkøbing (DK); Borja Fernandez Garcia, Asturias (ES)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/768,599

(22) PCT Filed: Oct. 2, 2020

(86) PCT No.: PCT/DK2020/050268
§ 371 (c)(1),
(2) Date: Apr. 13, 2022

(87) PCT Pub. No.: WO2021/078342
PCT Pub. Date: Apr. 29, 2021

(65) Prior Publication Data
US 2024/0110548 A1    Apr. 4, 2024

(30) Foreign Application Priority Data
Oct. 23, 2019    (DK) ........................... PA 2019 70661

(51) Int. Cl.
*F03D 80/50*        (2016.01)
*B23P 6/04*         (2006.01)
(Continued)

(52) U.S. Cl.
CPC ......... *F03D 80/703* (2023.08); *F03D 80/507* (2023.08); *B23P 6/04* (2013.01);
(Continued)

(58) Field of Classification Search
CPC .... B23P 6/00; B23P 6/04; F03D 80/50; F03D 80/507; F05B 2230/80; F05B 2230/90;
(Continued)

(56) References Cited

U.S. PATENT DOCUMENTS

2006/0068092 A1*  3/2006  Horn ..................... B05D 7/222
                                                  427/230
2011/0131781 A1   6/2011  Smith et al.
(Continued)

FOREIGN PATENT DOCUMENTS

CN    105149360 A    12/2015
CN    108361356 A     8/2018
(Continued)

OTHER PUBLICATIONS

Danish Patent and Trademark Office, Search and Examination Report in PA 2019 70661, Mar. 25, 2020.
(Continued)

*Primary Examiner* — Christopher J. Besler
(74) *Attorney, Agent, or Firm* — Wood Herron & Evans LLP (57) ABSTRACT

The present invention provides a method of repairing a bearing bore defined by an inner surface of a bearing housing, for instance a bearing housing that is part of a wind turbine. The method includes applying a liquid resin to at least part of the inner surface of the bearing housing. The method includes mounting a bore insert in the bearing bore, where the bore insert includes an arcuate portion having an edge positioned along a line of required radius of the bearing bore, so that the liquid resin fills a gap between the inner surface of the bearing housing and the edge of the arcuate portion of the bore insert. The method includes removing the bore insert from the bearing bore after the liquid resin has solidified to repair the bearing bore to the required radius.

(Continued)

Advantageously, the invention provides a relatively simple and inexpensive method for repairing a bearing bore that has suffered wear, that may be performed on-site and which obviates the need for potentially expensive component replacement of the bearing housing.

25 Claims, 7 Drawing Sheets

(51) Int. Cl.
*F03D 80/70* (2016.01)
*F16C 35/077* (2006.01)

(52) U.S. Cl.
CPC ....... *F05B 2230/80* (2013.01); *F05B 2230/90* (2013.01); *F05B 2240/54* (2013.01); *F16C 35/077* (2013.01); *F16C 2237/00* (2013.01)

(58) Field of Classification Search
CPC .. F16C 35/073; F16C 35/077; F16C 2237/00; B05D 5/005
See application file for complete search history.

(56) References Cited

U.S. PATENT DOCUMENTS

| | | | |
|---|---|---|---|
| 2016/0305397 | A1 | 10/2016 | Ohl, Jr. et al. |
| 2020/0114478 | A1* | 4/2020 | Luick ............... F04C 18/086 |

FOREIGN PATENT DOCUMENTS

| | | |
|---|---|---|
| DE | 2830996 A1 | 2/1979 |
| DE | 4118282 C1 | 8/1992 |
| DE | 102005048781 B3 | 11/2006 |
| EP | 1918065 A1 | 5/2008 |
| EP | 2381097 A1 | 10/2011 |

OTHER PUBLICATIONS

European Patent Office, International Search Report and Written Opinion in PCT Application No. PCT/DK2020/050268, Dec. 2, 2020.

* cited by examiner

METHOD OF REPAIRING A BEARING BORE AND BORE INSERT FOR REPAIRING A BEARING BORE

TECHNICAL FIELD

The invention relates generally to a method of repairing a bearing bore, for instance a bearing bore in a wind turbine. Aspects of the invention relate to a method and to a bore insert for use in repairing the bearing bore.

BACKGROUND

Wind turbines for power generation are well known in the art. The size and scale of wind turbines is becoming ever larger to increase their power generating capacity. A typical wind turbine has a tower supporting a nacelle, a rotor hub and a plurality of rotor blades connected to the rotor hub.

The nacelle of a wind turbine houses a number of bearings for supporting, and facilitating rotation of, a number of different components, e.g. shafts or gear components. For instance, a main shaft of the wind turbine extends between the rotor and a gearbox assembly of the wind turbine, and will typically be supported by a main bearing at the rotor side and another bearing at the gearbox side. A generator shaft of the wind turbine extends between the gearbox assembly and a generator of the wind turbine, and can also be supported by one or more bearings. In the gearbox assembly, bearings are used to support rotating gear components, e.g. a planetary gear outer ring. Other bearings in a wind turbine may include, for example, a yaw control mechanism bearing or a blade pitch control mechanism bearing.

A bearing is housed in a bearing bore defined by a bearing housing—or other housing, e.g. gearbox housing—of the wind turbine. The bearing includes an inner ring fixed to the rotating component and an outer ring fixed to the housing, where the inner ring rotates with the rotating component and relative to the outer ring. The particular means for allowing this relative rotation is dependent on which type of bearing is used. Some examples of bearings well-known to the skilled person are ball bearings, roller bearings, and plain bearings.

In certain scenarios, the outer ring can rotate. The friction resulting from such relative movement causes wear to the housing. In particular, this can cause a reduction in housing thickness or increase in the radius of the bearing bore. This is undesirable because it leads to an increased likelihood of the bearing outer ring rotating during normal operation of the wind turbine such that the bearing does not perform its function properly. The wear to the housing is also undesirable because it can lead to misalignment of the rotating components that the bearing supports. For instance, in the case of a bearing for a planetary gear outer ring, the gears and pinion of the gear assembly may become misaligned and cause damage to, or even failure of, the gear components, e.g. broken gear teeth, component fracture, etc., necessitating replacement of the entire gearbox, which is a particularly expensive component. Misalignment of the rotating components can also be caused by manufacturing problems or fretting corrosion.

One idea for addressing this problem is to form a metal plate and attach it to either the outer surface of the bearing outer ring, or to the inner surface of the bearing housing defining the bore, in order to fill in the gap created by the wear. However, this suffers the disadvantage of being expensive and laborious to form a metal plate of the correct dimensions.

Another idea for addressing the problem of bearing housing wear is to manually add metal glue—or epoxy glue—to the inner surface of the bearing housing. This is then allowed to set such that the combined housing inner surface and solidified glue restore the nominal or required radius of the bore. However, this suffers the disadvantage that the application of the glue needs to be performed manually by an individual, making it is difficult to achieve the correct dimension of the bore.

It is against this background to which the present invention is set.

SUMMARY OF THE INVENTION

According to an aspect of the invention there is provided a method of repairing a bearing bore defined by an inner surface of a bearing housing. The method comprises applying a liquid resin to at least part of the inner surface of the bearing housing. The method comprises mounting a bore insert in the bearing bore, where the bore insert includes an arcuate portion having an edge positioned along a line of required radius of the bearing bore, so that the liquid resin fills a gap between the inner surface of the bearing housing and the edge of the arcuate portion of the bore insert. The method comprises removing the bore insert from the bearing bore after the liquid resin has solidified to repair the bearing bore to the required radius.

The method may comprise applying a liquid resin resistant coating to the edge of the bore insert prior to mounting the bore insert in the bearing bore.

The liquid resin resistant coating may comprise a wax coating.

The bore insert may comprise a flange portion. Mounting the bore insert in the bearing bore may comprise attaching the flange portion to the bearing housing. The flange portion may extend from opposite sides of the arcuate portion.

The bore insert may comprise at least one overflow hole to allow excess liquid resin to escape from the gap between the inner surface of the bearing housing and the edge of the arcuate portion of the bore insert. In an embodiment, the at least one overflow hole is located in the flange portion where the edge of the arcuate portion of the bore insert meets the flange portion. In various embodiment, the number of overflow holes may be 2 or 4.

The arcuate portion of the bore insert may form substantially a semi-circular arcuate portion. The flange portion may be attached to a first half portion of the bearing housing defining substantially half of the bearing bore.

The flange portion may be attached to the first half portion of the bearing housing by inserting attaching means through respective holes in the flange portion and the first half portion of the bearing housing.

The flange portion may sit flush with the first half portion of the bearing housing when attached thereto.

Mounting the bore insert in the bearing bore may comprise attaching a stiffening member to a side of the flange portion opposite a side that sits flush with the bearing housing.

The bore insert may comprise a ridge along the edge of the arcuate portion. The ridge may be received into a corresponding groove in the inner surface of the bearing housing when the bore insert is mounted in the bearing bore. In some examples, the bore insert comprises a ridge at each of a front and a rear side of the arcuate portion.

In various embodiments, the ridges are adapted to allow excess liquid resin to escape from said gap between the inner surface of the bearing housing and said edge of the arcuate portion of the bore insert via said grooves. In one embodiment, each ridge may have an axial width (axial relative to the bore) of less than the axial width of the corresponding groove, such as less than 90% hereof. In one embodiment, each ridge may have a radial extension from said edge (radial relative to the bore) of less than the radial extension of said edge of the corresponding groove, such as less than 90% hereof.

The method may comprise removing an excess amount of the solidified liquid resin after removing the bore insert from the bearing bore so that the bearing bore has the required radius. Removing part of the solidified liquid resin comprises sanding the solidified liquid resin.

The bearing housing may be part of a wind turbine.

The bearing housing may be part of a gearbox assembly of the wind turbine.

According to an aspect of the invention there is provided a method of repairing a bearing bore in a wind turbine. The wind turbine has a bearing housing with an inner surface defining the bearing bore. The method comprises applying a liquid resin to at least part of the inner surface of the bearing housing. The method comprises mounting a bore insert in the bearing bore, where the bore insert includes an arcuate portion having an edge positioned along a line of required radius of the bearing bore, so that the liquid resin fills a gap between the inner surface of the bearing housing and the edge of the arcuate portion of the bore insert. The method comprises removing the bore insert from the bearing bore after the liquid resin has solidified to repair the bearing bore to the required radius.

According to another aspect of the invention there is provided an insert for repairing a bearing bore defined by an inner surface of a bearing housing. The bore insert comprises an arcuate portion having a radius corresponding to a required radius of the bearing bore. The bore insert comprises a flange portion for attaching to the bearing housing to mount the bore insert in the bearing bore so that an edge of the arcuate portion is positioned along a line of the required radius of the bearing bore.

The flange portion may be formed as a separate part from the arcuate portion of the bore insert.

The arcuate portion of the bore insert may be formed by a moulding process.

The flange portion may comprise one or more holes for receiving attaching means to attach the flange portion to the bearing housing.

The bore insert may comprise a ridge along the edge of the arcuate portion for being received into a corresponding groove of the bearing bore when the bore insert is mounted in the bearing bore. In some examples, the bore insert comprises a ridge at each of a front and a rear side of the arcuate portion.

The bore insert may be formed from a polytetrafluoroethylene (PTFE) material.

The bearing housing may be part of a wind turbine.

According to another aspect of the invention there is provided an insert for repairing a bearing bore in a wind turbine having a bearing housing with an inner surface defining the bearing bore. The bore insert comprises an arcuate portion having a radius corresponding to a required radius of the bearing bore. The bore insert comprises a flange portion for attaching to the bearing housing to mount the bore insert in the bearing bore so that an edge of the arcuate portion is positioned along a line of the required radius of the bearing bore.

BRIEF DESCRIPTION OF THE DRAWINGS

Examples of the invention will now be described, by way of example only, with reference to the accompanying drawings, in which:

FIGS. 3(a) and 3(b) shows a lower half portion of the bearing housing of FIG. 2, and a bore insert according to an example of the invention for use in repairing a bearing bore of the bearing housing, in particular:

DETAILED DESCRIPTION

Figure 1:
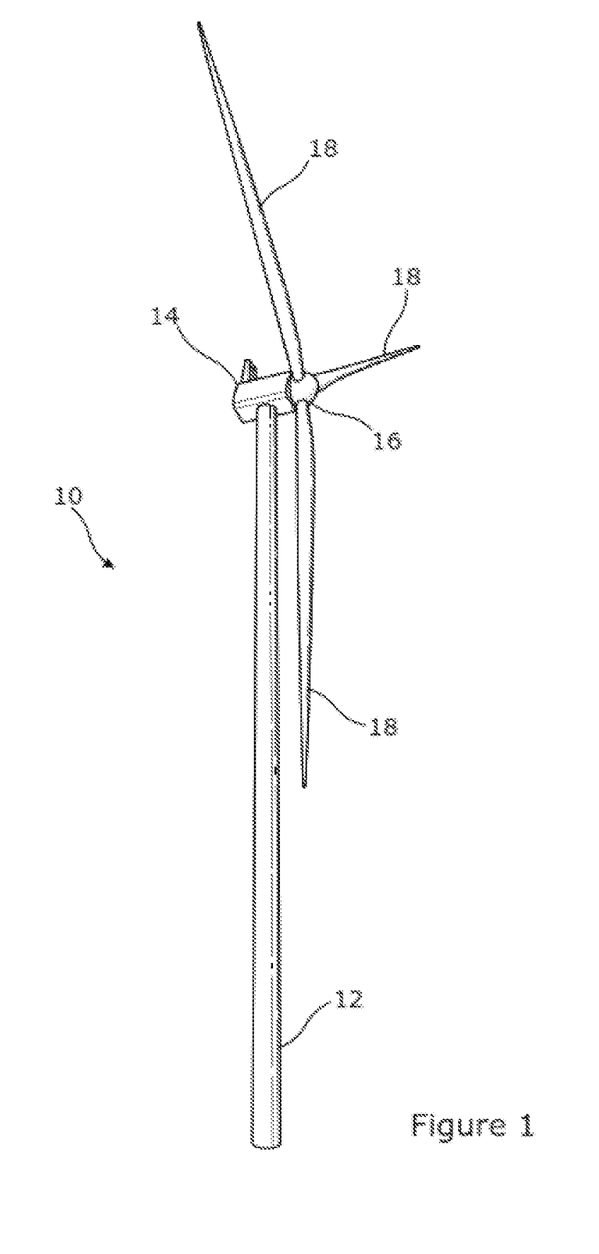
FIG. 1 illustrates a wind turbine including nacelle and a plurality of rotor blades.

FIG. 1 shows a wind turbine 10 including a tower 12, a nacelle 14 rotatably coupled to the top of the tower 12, a rotor including a rotor hub 16 mounted to the nacelle 14, and a plurality of wind turbine rotor blades 18—in the described example, three rotor blades—which are coupled to the rotor hub 16. The nacelle 14 and rotor blades 18 are turned and directed into the wind direction by a yaw system. The nacelle 14 houses generating components (not shown) of the wind turbine 10, including a generator, gearbox assembly, drivetrain and brake assembly, as well as convertor equipment for converting the kinetic energy of the wind into electrical energy for provision to the grid. The wind turbine 10 is shown in its fully-installed form suitable for operation; in particular, the rotor hub 16 is mounted on the nacelle 14 and each of the blades 18 are mounted on the rotor hub 16.

Figure 2:
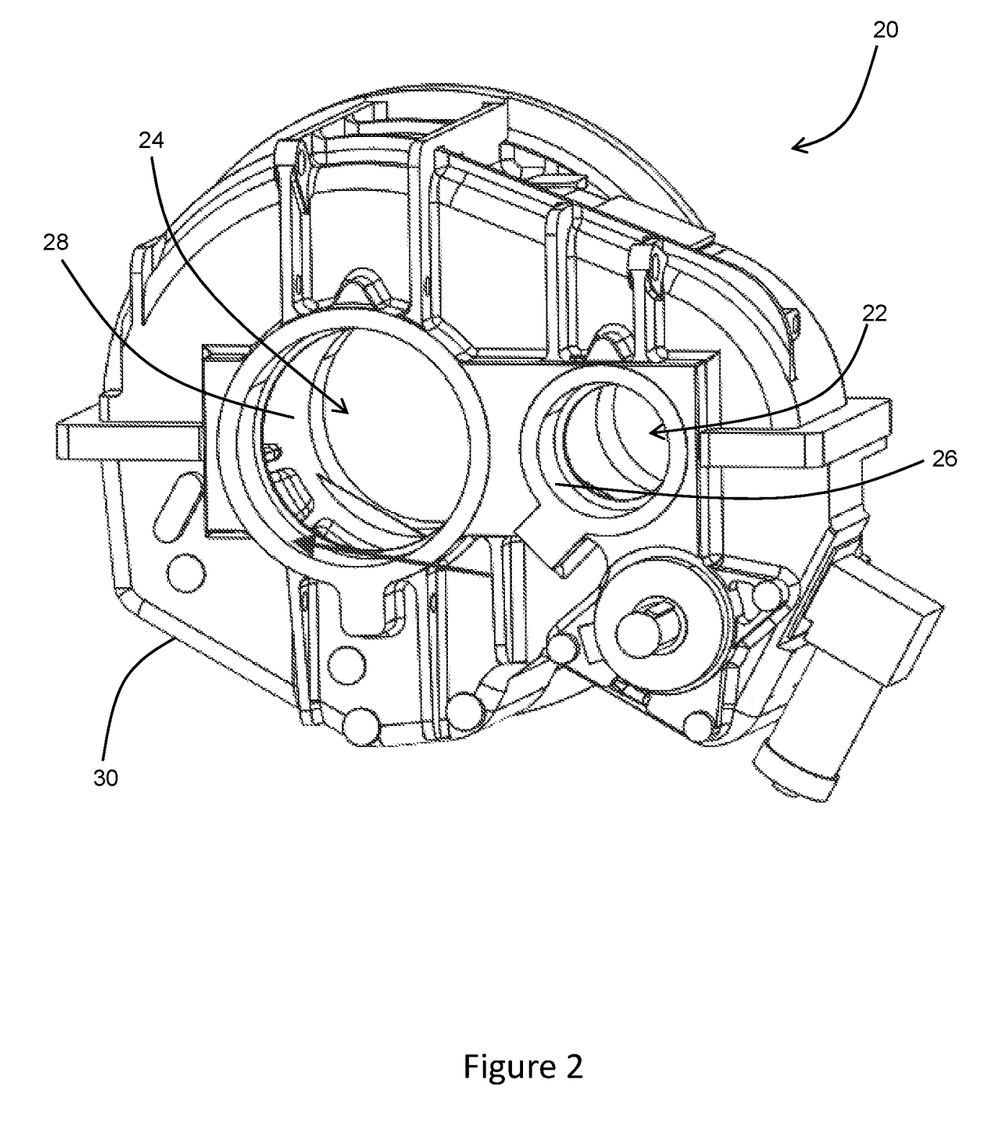
FIG. 2 shows a bearing housing of a gear assembly of the wind turbine of FIG. 1.

FIG. 2 illustrates a bearing housing 20—or gearbox housing—of the gearbox assembly housed in the nacelle 14 of the wind turbine 10. The housing 20 supports or houses a number of components of the gearbox assembly. The gearbox is used to increase the rotational speed of the main shaft driven by the rotation of the rotor hub 16 and rotor blades 18 to the rotational speed of the generator shaft that drives the wind turbine generator.

The housing 20 defines a number of bearing bores; in particular, in the described example a first bore 22 and a second bore 24 are formed by the housing 20. That is, the housing has an inner surface 26 defining the first bore 22 and an inner surface 28 defining the second bore 24. By 'inner surface' is meant the circumferential inner surface defining the bores. The bores 22, 24 are arranged to receive or house bearings for facilitating rotation of the rotating shafts. Specifically, the first bore 22 is for receiving an input shaft and the second bore 24 is for receiving an output shaft. In a single stage gearbox, this would be the main shaft and the generator shaft. In a multi-stage gearbox, this could be a neighbouring gear stage at one or both sides. Each bearing includes an outer ring and an inner ring rotatable relative to the outer ring with suitable means for allowing this relative rotation dependent on which type of bearing is used. Some examples of bearings well-known to the skilled person are ball bearings, roller bearings, and plain bearings. The outer ring is fixed to the respective inner surface 26, 28 of the housing 20, and the inner ring is fixed to the rotatable component/shaft within the bore 22, 24.

Figure 3A:
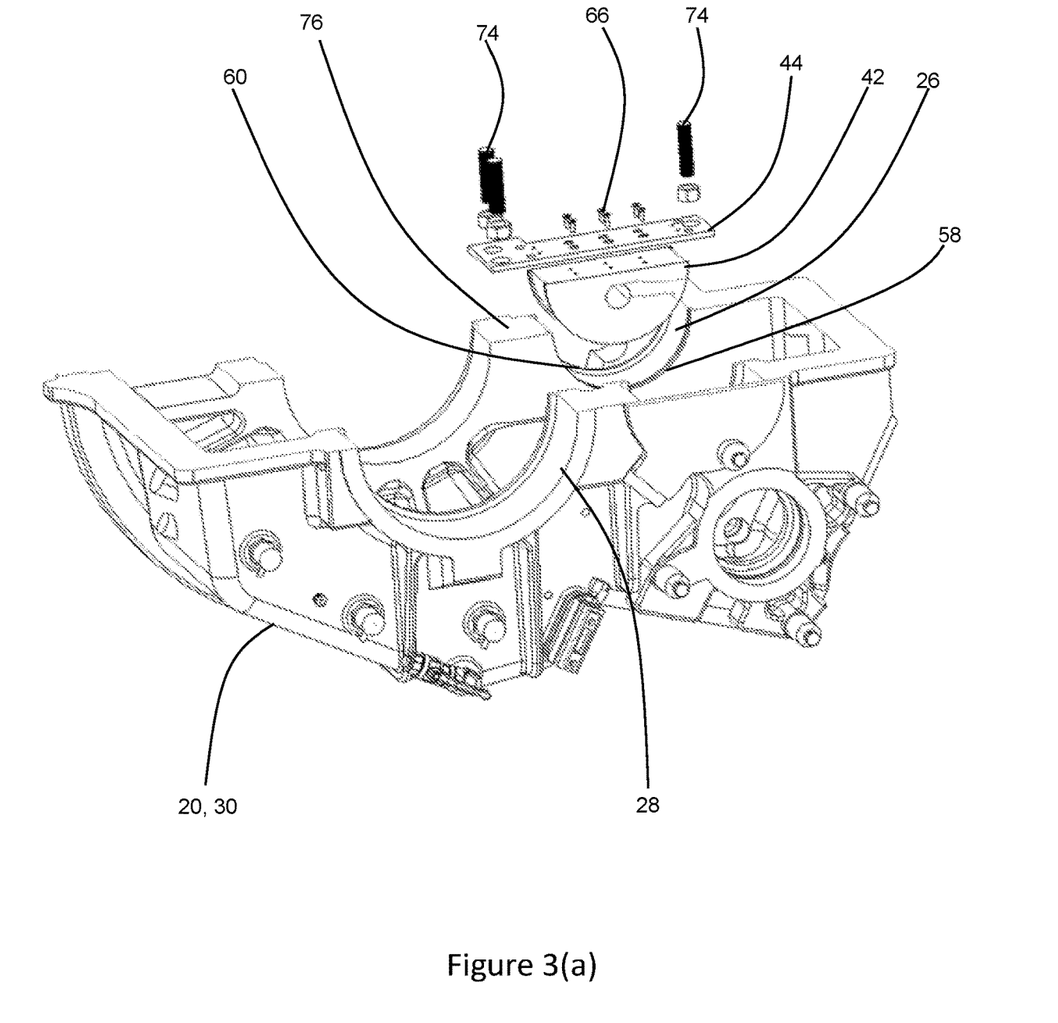
FIG. 3(a) shows the bore insert prior to being mounted in a bearing bore.
Figure 3B:
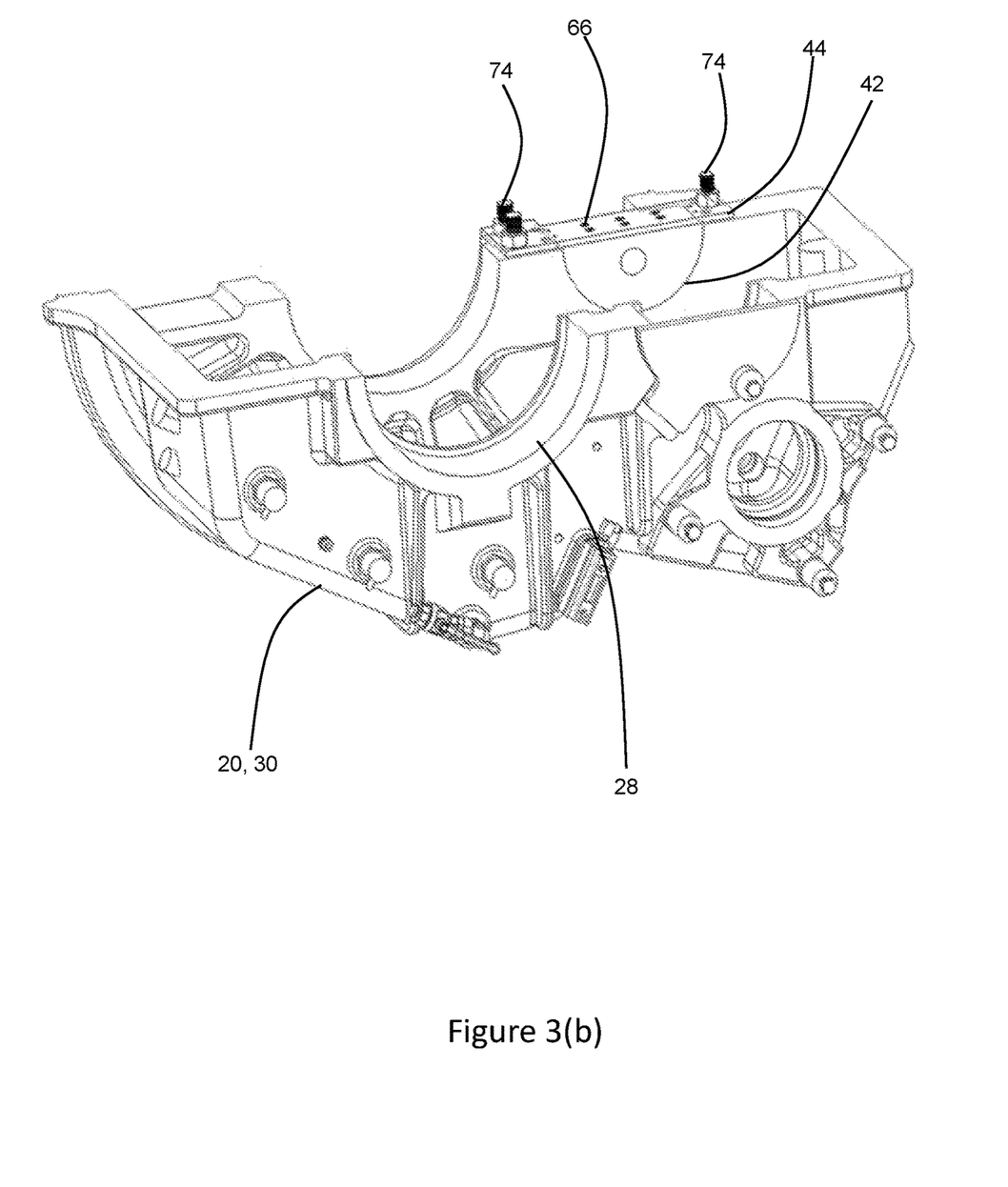
FIG. 3(b) shows the bore insert mounted in the bearing bore.

With additional reference to FIGS. 3(a) and 3(b), the housing 20 is a split housing having upper and lower half portions. In FIGS. 3(a) and 3(b), only the lower half portion is shown. The lower half portion 30 defines a lower half of each of the bores 22, 24, i.e. a semi-circular bore shape. That is, the inner surface of the lower half portion 30 is of semi-circular shape. Similarly, the upper half portion defines a corresponding upper half of each of the bores 22, 24. The upper half portion of the housing 20 is attached to the lower half portion 30—for instance, by using attachment bolts—to complete the housing and thereby define the full bores 22, 24 as shown in FIG. 2.

During operation of the wind turbine 10, the bearing outer ring may in certain undesired scenarios rotate or otherwise move relative to the inner surface 26, 28 of the bores 22, 24. This may cause wear of the bore inner surfaces 26, 28 such that the shape of the bores 22, 24 may change. In particular, the radius of the bores 22, 24 may change such that the respective bearings are no longer positioned correctly in the bores 22, 24, which can cause damage or even failure of the gearbox components. Specifically, a gap may form between the outer bearing ring and the inner surface 26, 28 of the bearing bores 22, 24, which may increase the likelihood of further relative movement between the bearing outer ring and the bore 22, 24.

A method for repairing the bore 22 that has suffered wear as outlined above is now described, together with an insert or mould piece that is used as part of the repair method. With continuing reference to FIGS. 3(a) and 3(b), and with additional reference to FIG. 4, there is provided a bore insert or mould piece 40 for use in repairing the bearing bore 22. The bore insert 40 includes an arcuate or curved portion 42 and a flange portion 44. In the described example, the arcuate portion 42 is formed from polytetrafluoroethylene (PTFE); however, any suitable material may be used. The arcuate portion 42 is in this example of semi-circular shape having an arcuate or semi-circular edge 46 that defines the semi-circular part and a straight edge 48 that is substantially flat. In the described example, the arcuate portion 42 is formed by a moulding process to obtain a generally solid piece. Obtaining the arcuate portion 42 by a moulding process may be advantageous in that it can readily provide a piece of precise shape and size, as desired.

Figure 4:
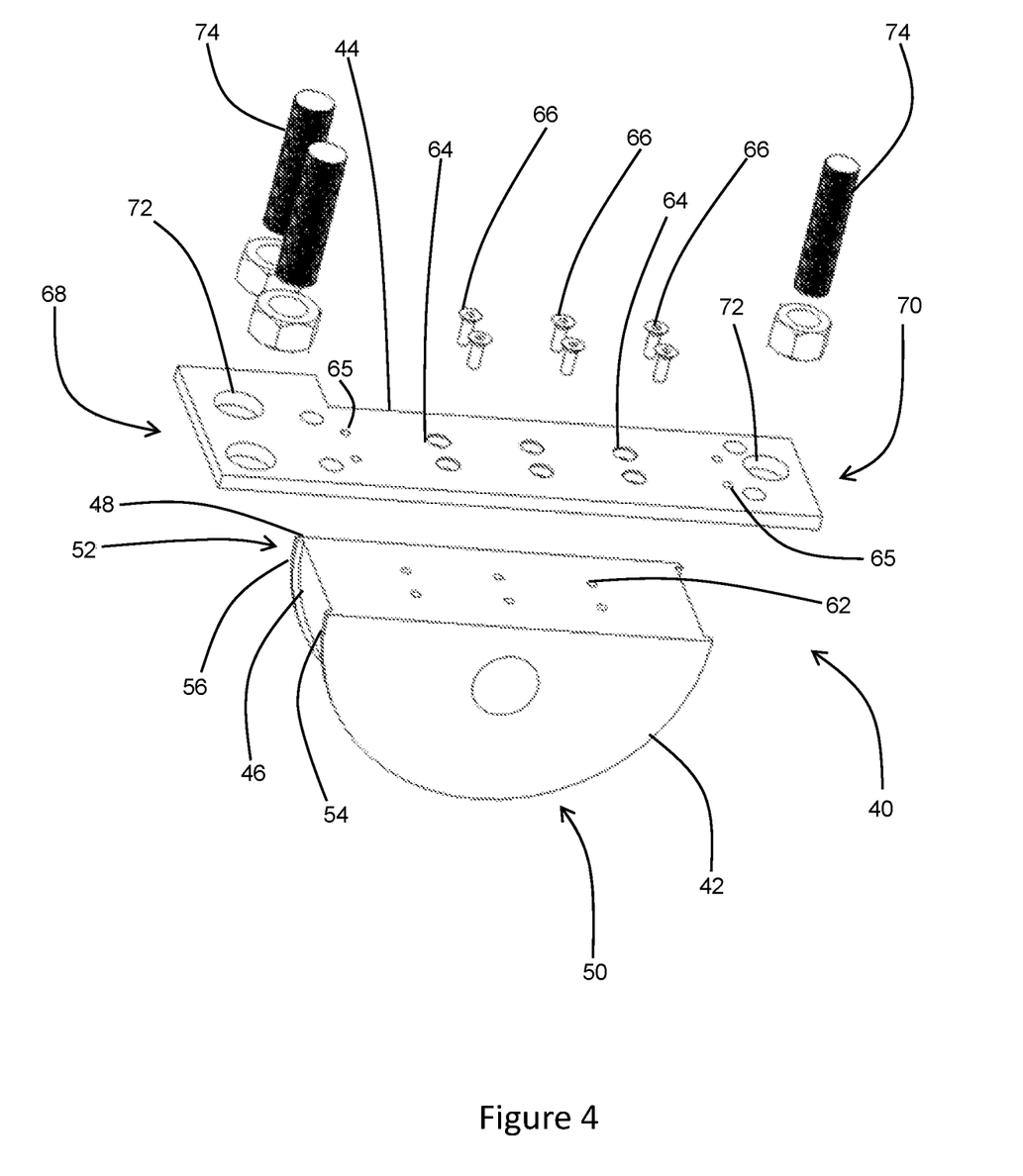
FIG. 4 shows an exploded view of the bore insert of FIGS. 3(a) and 3(b)

The arcuate portion 42 is sized to fit the bearing bore 22. In particular, a depth of the arcuate portion 42 is equal to the depth of the bore 22 in a longitudinal direction of the bore 22, i.e. along an axis of rotation of the shaft that is housed in the bore 22. At each of the front and rear sides 50, 52 of the arcuate portion 42, the arcuate edge 46 has a ridge or lip 54, 56 that extends along the arcuate edge 46, where each ridge or lip 54, 56 is to be received into a corresponding groove 58, 60 in the inner surface 26 of the bearing housing 20.

The radius of the semi-circular portion 42 is equal to a nominal or required radius of the bearing bore 22, i.e. a radius of the bearing bore 22 prior to it suffering wear. Note that the radius of the arcuate edge 46 is therefore smaller than the radius of the bearing bore 22 after it has suffered wear, at least along part of the inner surface 26 of the bore 22. The radius of the arcuate portion 42 therefore corresponds to the radius of the outer ring of the bearing to be supported in the bore 22.

The arcuate portion 42 has a number of holes 62—e.g. screw holes 62—along its straight edge 48 for use in attaching the arcuate portion 40 to the flange portion 44, as will be described below. The arcuate portion 42 also has a hole extending therethrough between its front and rear sides. This allows for easy movement of the arcuate portion 40 out of the bore, e.g. using a sling that extends through the hole and which is attached to a lifting crane.

The flange portion 44 of the bore insert 40 is for attaching to the arcuate portion 42 and, in particular, for securing the arcuate portion 42 in a required position in the bore 22. The flange portion 44 is elongate, having a length greater than the length of the straight edge 48 of the arcuate portion 42 (which is also the diameter of the arcuate portion 42). The flange portion 44 has a number of holes extending therethrough. In particular, the flange portion 44 has a number of screw holes 64 corresponding to the screw holes 62 in the straight edge 48 of the arcuate portion 42. The flange portion 44 may therefore be attached to the arcuate portion 42 using screws 66 inserted through the respective screw holes 62, 64 of the arcuate and flange portions 42, 44. When attached together, the flange portion 44 sits adjacent to, and flush with, the straight edge 48 of the arcuate portion 42. The flange portion 44 may be formed from a relatively stiff material so that it can secure the arcuate portion 42 in position in the bearing bore. Alternatively, or in addition, a separate stiffening member (not shown) may be used to ensure that the bore insert is secured in place when mounted in the bore. For instance, a separate stiffening member—formed from a stiffer material than the bore insert 40—may be an elongate member attached to a side of the flange portion 44 opposite a side that contacts the bearing housing 20 when the bore insert 40 is mounted in the bore 22.

Towards either edge 68, 70 of the flange portion 44 are a number of bolt holes 72. In particular, the bolt holes 72 are located in the parts of the flange portion 44 that extend beyond the diameter of the straight edge 48 of the arcuate portion 42 when the arcuate and flange portions 42, 44 are attached together. Specifically, the flange portion 44 may be attached to the housing 20 by using bolts 74 that extend through the bolt holes 72 in the flange portion 44 and corresponding bolt holes 76 in the housing 20. The bolt holes 76 in the lower half portion 30 of the housing 20 may conveniently be the bolt holes 76 used to attach the upper and lower half portions of the housing 20 together, also using bolts. Further, the flange portion 44 has four overflow holes 65 for excess liquid resin. These overflow holes 65 are for draining excess liquid resin in combination with draining excess liquid resin via the ridges 54, 56. In particular if much higher amount of resin than needed is applied, it is preferable to have multiple draining positions, i.e. both via the ridges 54, 56 and by means of these extra four holes located in the flange portion 44 where the arcuate edge 46 meets the flange portion 44.

Figure 5:
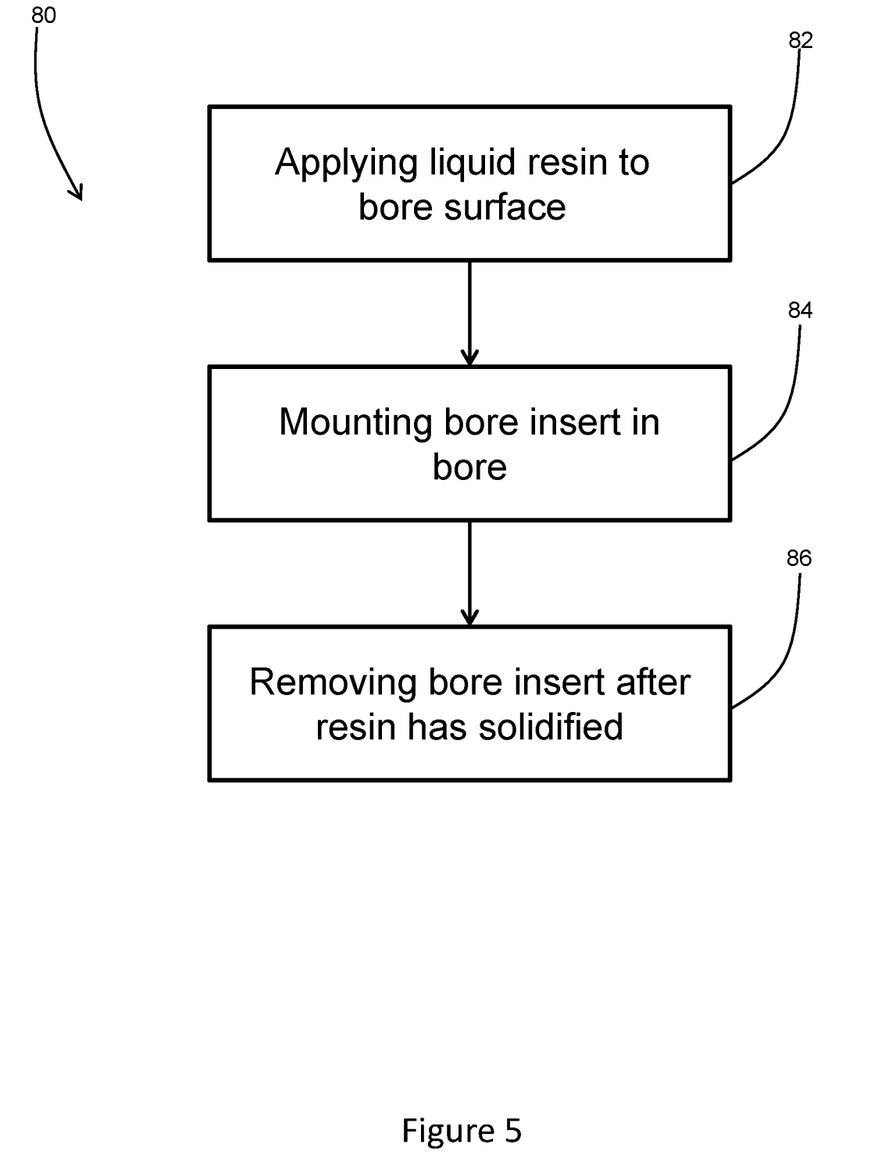
FIG. 5 shows the steps of a method for repairing the bearing bore using the bore insert in FIGS. 3(a) and 3(b); and, FIGS. 6(a) and 6(b) show perspective and side views of a bore insert according to another example of the invention.

FIG. 5 outlines the steps of a method 80 of repairing the bearing bore 22. In the described example, the bore to be repaired is part of a wind turbine gearbox assembly. The gearbox assembly therefore needs to be at least partly disassembled from its operating configuration. In particular, the upper half portion of the split housing 20 needs to be detached from the lower half portion 30. This may involve removing attachment bolts from the bolt holes 76 in the lower half portion 30 and corresponding bolt holes in the upper half portion that attach the upper and lower portions of the split housing 20 together, and then removing the upper half portion from the lower half portion 30. Disassembling the gearbox may also include removing the generator shaft from the bore 22 and/or removing or disassembling one or more of the gearbox components from the housing 20.

At step 82 of the method 80, a liquid resin is applied to at least part of the inner surface 26 of the bore 22, in particular to at least part of the inner surface 26 defined by the lower half portion 30. For instance, the application of resin may be restricted to specific parts of the inner surface 26 that have suffered wear, or may be to the entire inner surface 26 defined by the lower half portion 30. The liquid resin is in particular an epoxy glue or metal glue. The amount of glue that is applied is of sufficient thickness at each part of the bore 22 to fill the gap formed between the worn out bore surface 26 and the bearing outer ring when the gearbox is in its assembled state. Crucially, however, the exact amount of glue being applied is not critical.

Prior to application of the liquid resin, the inner surface 26 may be cleaned to remove any dirt or impurities from the bore 22. Also, sandpaper—or some other coated abrasive—may be used to grind the inner surface 26 to roughen the surface prior to applying the liquid adhesive, which can help to ensure that the resin adheres or sticks the inner surface 26.

At step 84, the bore insert 40 is mounted in the bearing bore 22, in particular the bore insert 40 is mounted to the lower half portion 30 of the split housing 20 and in the semi-circular open bore 22 defined by the lower half portion 30. Specifically, the flange portion 44 is attached to the arcuate portion 42 by aligning the screw holes 64 of the flange portion 44 with the corresponding screw holes 62 of the arcuate portion 42 and securing together using the screws 66. The bore insert 40 is then mounted to the housing 20 by positioning the arcuate portion 42 in the bore 22 and aligning the bolt holes 72 of the flange portion 44 with the bolt holes 76 of the housing 20 and securing together using the bolts 74. Mounting the bore insert 40 in the bore 22 also includes the ridges 54, 56 along the edge 46 of the arcuate portion 42 being received into the grooves 58, 60 of the inner surface 26 of the housing 20, which assists in positioning the bore insert 40 correctly in the bore 22. FIG. 3(a) shows the arcuate and flange portions 42, 44 of the bore insert prior to being mounted to the housing 20, and FIG. 3(b) shows the bore insert 40 mounted in the bore 22.

When the bore insert 40 is mounted in the bore 22, the edge 46 of the arcuate portion 42 is positioned along a line of required radius of the bearing bore 22. In particular, the arcuate edge 46 is positioned along a line defining the required inner surface of the bore 22, i.e. the inner surface 26 prior to wear being suffered. The screw holes 62, 64 and the bolt holes 72 of the bore insert 40 are designed and positioned such that when the arcuate and flange portions 42, 44 are attached together, and the flange portion 44 is attached to the housing 20, the arcuate portion 42 is in the correct position in the bore 22 such that the arcuate edge 46 is positioned along the nominal bore surface.

Prior to mounting the bore insert 40 in the bearing bore 22, a liquid resin resistant coating may be applied to at least part of the bore insert 40. In particular, the coating may be a wax coating. The coating is applied to at least those parts of the bore insert 40 that will come into contact with the resin when the bore insert 40 is mounted in the bore 22. Hence, the coating is applied at least to the arcuate edge 46 of the arcuate portion 42; however, the coating may equally be applied to other parts of the arcuate portion 42, for instance all of the arcuate portion 42. Indeed, in certain examples the coating may also be applied to the flange portion 44. The resin resistant coating advantageously ensures that the liquid resin applied to the inner surface of the bore 22 does not stick to the bore insert 40 when the bore insert 40 is mounted in the bore 22.

When the bore insert 40 is mounted in the bore 22, the liquid resin fills the gap defined between the (worn) inner surface 26 of the bearing housing 20 and the edge 46 of the arcuate portion 42 of the bore insert 40. As the bore insert 40 is mounted in the bore 22 such that the edge 46 of the arcuate portion 42 is positioned along the required radius of the bore 22, i.e. prior to bore surface wear, the resin is squeezed in the gap such that it occupies only the gap formed by the wear to the bore surface. The ridges 54, 56 assist in ensuring that the liquid resin in the gap is of the desired thickness and at the same time allowing that excess liquid resin may escape via the grooves 58, 60. In preferred embodiments, the ridges 54, 56 are axially and/or radially smaller than the grooves 58, 60 thereby facilitating that liquid resin can flow out (axially and radially in relation to the bore 22). The bore insert 40 remains mounted and positioned in the bore 22 until the resin has solidified or dried. For instance, the bore insert 40 may be mounted in the bore 22 for several hours, such as at least 2 hours or, for instance, approximately 12 hours.

At step 86 after the liquid resin has solidified or dried, the bore insert 40 is removed from the bearing bore 22 to leave a repaired bearing bore 22 that has the required radius, i.e. the radius prior to wear. That is, the parts of the bore inner surface that were worn away have been replaced by solidified or dried epoxy glue. Furthermore, the use of the bore insert 40 precisely positioned in the bore 22 ensures that the correct amount of solidified resin at the correct locations in the bore 22 to restore the correct or required radius of the bore 22 is left in the bore 22 after the bore insert 40 is removed. The wax coating on the bore insert 40 assists in ensuring that glue is not removed from the bore 22 when the bore insert 40 is removed.

When the liquid resin is applied to the bore inner surface (at step 82), an excess amount of liquid resin may be used, i.e. more liquid resin than is needed to fill the gap formed by bore wear. As such, when the bore insert 40 is mounted in the bore 22 (at step 84) excess liquid resin may be squeezed out from the gap formed between the bore inner surface 26 and the arcuate edge 46 of the bore insert 40, e.g. towards the front and rear side of the bore 22 through the overflow holes 65, or towards the left/right sides via the ridges 54, 56. This excess liquid resin may be removed, e.g. wiped away, prior to the solidification of the resin. Alternatively, once the bore insert 40 has been removed from the bore 22 after the resin has solidified (step 86), the excess solidified resin may then be removed, for instance using a sheet of coated abrasive, e.g. sandpaper.

The method of repairing the bore 22 may further include measuring the dimensions of the bore once the bore insert 40 has been removed from the bore 22. This is in order to ensure that the bore 22—defined by the housing inner surface 26 and the solidified epoxy resin—has the required radius to ensure correct operation of the gearbox and its components. For instance, the repaired bore radius may be checked to ensure that it is within a prescribed tolerance.

The above describes how the part of the bearing bore 22 defined by the lower half portion 30 of the split housing 20 is repaired. A similar process or method may be needed to repair the part of the bearing bore 22 defined by the upper half portion of the split housing 20, if needed. As each portion of the split housing 20 defines half of the bore 22, i.e. a semi-circle, then the same arcuate portion 42 used to repair the lower half portion 30 may be used to repair the upper half portion of the split housing 20. The same flange portion 44 may also be used, although this will depend on the location of the attachment points/holes in the upper half portion as the flange portion must be attached to the housing 20 such that the arcuate portion of the bore insert is positioned correctly in the bore.

The bearing bore 24 defined by the housing 20 may be repaired in a similar manner to the bearing bore 22 described above. It is noted that the 'input shaft' bore 24 is larger than the 'output shaft' bore 22, in particular the radius of the input shaft bore 24 is greater than that of the output shaft bore 24. As such, a different bore insert—having differently-sized arcuate and flange portions—is needed to repair the bore 24 from the bore insert 40 used to repair the bore 22.

Once one or both of the bearing bores 22, 24 have been repaired the gearbox may be re-assembled for operation. In addition to the time allowed for the applied liquid resin to solidify or set while the bore insert is mounted in the bore, there may be a further amount of waiting time before the gearbox—and indeed the wind turbine—starts up and resumes operation. For instance, this further drying time for the resin may be several hours, e.g. approximately 72 hours in total including the time the bore insert is mounted in the bore.

Many modifications may be made to the above-described example without departing from the scope of the appended claims.

Figure 6A:
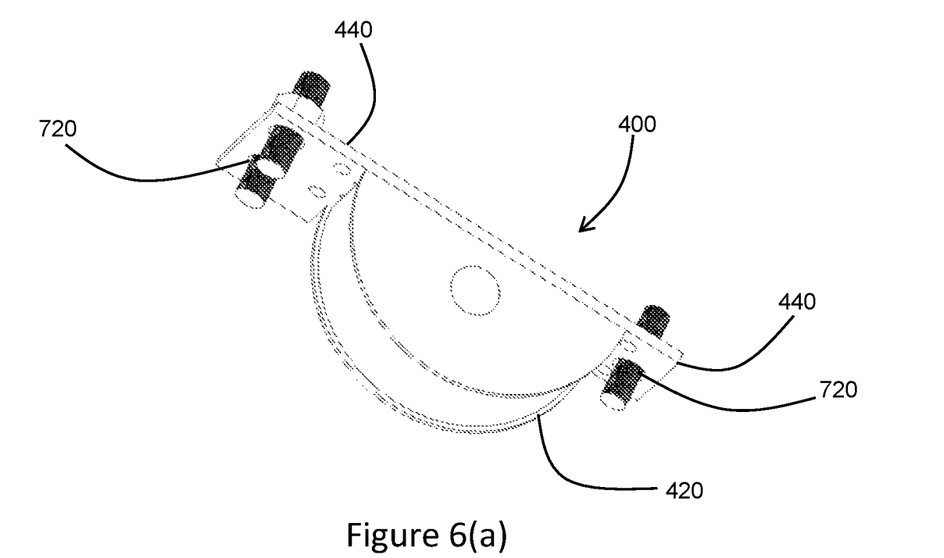
Figure 6B:
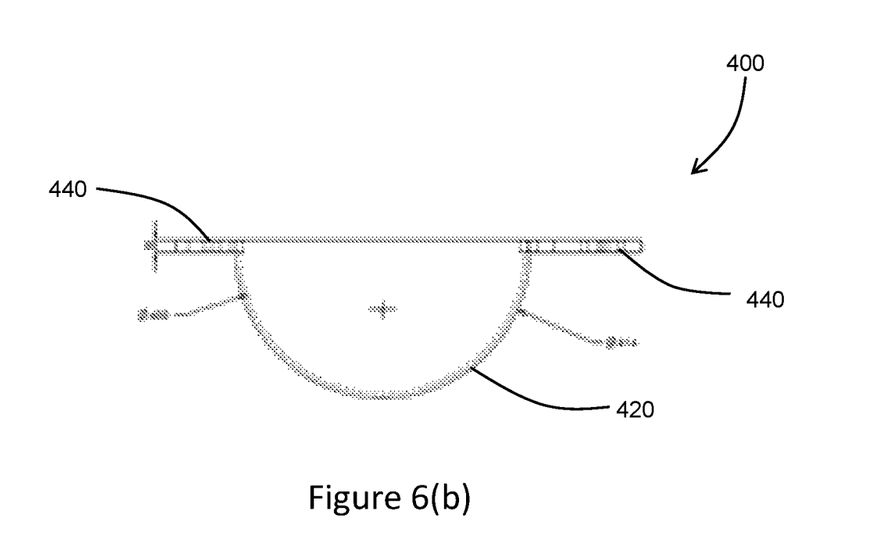

In the above-described example, the arcuate and flange portions of the bore insert are formed as separate parts or pieces; however, in different examples the arcuate and flange portions may be integrally formed. For instance, FIGS. 6(*a*) and 6(*b*) show perspective and side views of a bore insert 400 according to another example of the invention in which an arcuate portion 420 and a flange portion 440 are integrally formed. As the arcuate and flange portions 420, 440 are integrally formed, then there is no need for screw holes to attach these portions together; however, the flange portion 440 does include bolt holes 720 for securing the bore insert 400 to the bore housing so that the arcuate portion 420 is mounted and positioned correctly in the bearing bore. The arcuate portion 420 in FIGS. 6(*a*) and 6(*b*) may be otherwise the same as the arcuate portion 42 of FIG. 4, having an arcuate edge 46 with ridges 54, 56. Forming the arcuate and flange portions as separate parts may advantageously result in a simpler manufacturing process, i.e. the moulding process may be simpler as the separate parts are of simpler shape. However, forming the bore insert as a singular piece may be preferable as it reduces the number of parts to be manufactured, and reduces the number of attachment points needed, e.g. screw holes for joining the arcuate and flange portions.

In the above-described example, the arcuate portion of the bore insert is semi-circular in shape for mounting in a semi-circular half bore defined by one half of a split housing. In different examples, however, the arcuate portion may define a greater or smaller part of a circle than a semi-circle. For instance, the arcuate portion may form a smaller part of a circle if only a certain part of a bore needs to be repaired.

The above described example describes a bore insert that is secured to one half of a split-housing. In different examples, however, a bore insert for mounting in a bore not defined by a split-housing is envisioned. For instance, the bore insert may be mounted in a circular bore—where the arcuate portion forms a full circle or part of a circle.

In the above-described example, a flange portion of the bore insert is secured to the bore housing to mount the arcuate portion of the bore insert in a correct position in the bore. In different examples, however, the bore insert may not include a flange portion and instead the arcuate portion may be mounted in the bore by another means. This may particularly be the case when mounting the bore insert in a bore not defined by a split-housing.

The above-described example relates to repairing a bore defined by a gearbox housing of a wind turbine. The described method is also applicable, however, to any kind of bearing bore in a wind turbine that may suffer wear as described. For instance, such bearing bores may include a yaw control mechanism bearing or a blade pitch control mechanism bearing.

Although in the exemplary examples described above the invention is described with reference to a bearing bore in a wind turbine, the invention is also applicable to a bearing bore defined by the inner surface of a bearing housing that is part of a mechanical arrangement other than a wind turbine. In particular, many different types of mechanical components or machines include bearing bores that may become damaged or worn as outlined above, and the described method and bore insert is therefore equally applicable to such arrangements. For instance, mechanical arrangements in industrial compressors/expanders, in automotive vehicles such as cars or trucks, or in aircraft may comprise bearing bores that suffer wear as described.

Examples of the invention are advantageous in that they provide a relatively simple method for repairing a wind turbine bearing bore that has suffered wear. In particular, a method is provided in which liquid resin, such as epoxy glue, for repairing the worn-out bore is applied accurately—i.e. a correct amount in the correct position—without the need for careful and skillful application by a technician. This ensures that a bearing that is supported in the repaired bore is positioned and aligned correctly to avoid causing damage to associated wind turbine components, e.g. gearbox components such as gear wheels or pinions.

Examples of the invention are advantageous in that they provide a relatively inexpensive method and (temporary) insert for repairing a wind turbine bearing bore. In particular, a method is provided which obviates the need for the manufacture of a bespoke replacement insert—e.g. a metal insert—for permanent insertion into the bearing bore to repair the bore. Such a replacement insert would need to be manufactured to be an accurate size to fill a particular gap formed by bearing bore wear, and would need to be bespoke to the particular gap. In contrast, examples of the invention are advantageous in that the same method and temporary insert may be used to repair different gaps of different size and position in a bearing bore.

Examples of the invention are advantageous in that they provide a method for repairing a worn-out bearing bore of a wind turbine on-site without needing to remove the worn-out parts from the wind turbine, either to be replaced or to perform off-site repair. This reduces costs involved with transporting and/or replacing wind turbine components, and also reduces costs by minimising the amount of time that a wind turbine is out of operation.

The invention claimed is:

1. A method of repairing a bearing bore defined by an inner surface of a bearing housing, the method comprising:
  providing a bore insert, the bore insert including an arcuate portion having an edge positioned along a line of required radius of the bearing bore;
  applying a liquid resin resistant coating to the edge of the bore insert;

applying a liquid resin to at least part of the inner surface of the bearing housing;

mounting the bore insert, having the liquid resin resistant coating thereon, in the bearing bore so that the liquid resin fills a gap between the inner surface of the bearing housing and the edge of the arcuate portion of the bore insert; and removing the bore insert from the bearing bore after the liquid resin has solidified to repair the bearing bore to the required radius.

2. The method according to claim 1, wherein the liquid resin resistant coating comprises a wax coating.

3. The method according to claim 1, wherein the bore insert comprises at least one overflow hole to allow an excess of the liquid resin to escape from said gap between the inner surface of the bearing housing and said edge of the arcuate portion of the bore insert.

4. The method according to claim 1, wherein the bore insert comprises a flange portion, and wherein mounting the bore insert in the bearing bore comprises attaching the flange portion to the bearing housing.

5. The method according to claim 4, wherein the arcuate portion of the bore insert forms substantially a semi-circular arcuate portion, and wherein the flange portion is attached to a first half portion of the bearing housing defining substantially half of the bearing bore.

6. The method according to claim 5, wherein the flange portion is attached to the first half portion of the bearing housing by inserting attaching means through respective holes in the flange portion and the first half portion of the bearing housing.

7. The method according to claim 5, wherein the flange portion sits flush with the first half portion of the bearing housing when attached thereto.

8. The method according to claim 3, wherein the bore insert comprises a flange portion connected to the arcuate portion, and wherein said at least one overflow hole is located in said flange portion where the edge of the arcuate portion of the bore insert meets the flange portion.

9. The method according to claim 1, wherein the bore insert comprises a ridge along the edge of the arcuate portion, the ridge being received into a corresponding groove in the inner surface of the bearing housing when the bore insert is mounted in the bearing bore.

10. The method according to claim 9, wherein said ridge is adapted to allow an excess of the liquid resin to escape from said gap between the inner surface of the bearing housing and said edge of the arcuate portion of the bore insert via said groove.

11. The method according to claim 1, comprising removing an excess amount of the solidified liquid resin after removing the bore insert from the bearing bore so that the bearing bore has the required radius.

12. The method according to claim 1, wherein the bearing housing is part of a wind turbine.

13. A method of repairing a bearing bore defined by an inner surface of a bearing housing, the method comprising:

applying a liquid resin to at least part of the inner surface of the bearing housing;

mounting a bore insert in the bearing bore, the bore insert including an arcuate portion having an edge positioned along a line of required radius of the bearing bore, so that the liquid resin fills a gap between the inner surface of the bearing housing and the edge of the arcuate portion of the bore insert; and removing the entirety of the bore insert from the bearing bore after the liquid resin has solidified to repair the bearing bore to the required radius.

14. The method according to claim 13, comprising applying a liquid resin resistant coating to the edge of the bore insert prior to mounting the bore insert in the bearing bore.

15. The method according to claim 14, wherein the liquid resin resistant coating comprises a wax coating.

16. The method according to claim 13, wherein the bore insert comprises at least one overflow hole to allow an excess of the liquid resin to escape from said gap between the inner surface of the bearing housing and said edge of the arcuate portion of the bore insert.

17. The method according to claim 13, wherein the bore insert comprises a flange portion, and wherein mounting the bore insert in the bearing bore comprises attaching the flange portion to the bearing housing.

18. The method according to claim 17, wherein the arcuate portion of the bore insert forms substantially a semi-circular arcuate portion, and wherein the flange portion is attached to a first half portion of the bearing housing defining substantially half of the bearing bore.

19. The method according to claim 18, wherein the flange portion is attached to the first half portion of the bearing housing by inserting attaching means through respective holes in the flange portion and the first half portion of the bearing housing.

20. The method according to claim 18, wherein the flange portion sits flush with the first half portion of the bearing housing when attached thereto.

21. The method according to claim 16, wherein the bore insert comprises a flange portion connected to the arcuate portion, and wherein said at least one overflow hole is located in said flange portion where the edge of the arcuate portion of the bore insert meets the flange portion.

22. The method according to claim 13, wherein the bore insert comprises a ridge along the edge of the arcuate portion, the ridge being received into a corresponding groove in the inner surface of the bearing housing when the bore insert is mounted in the bearing bore.

23. The method according to claim 22, wherein said ridge is adapted to allow an excess of the liquid resin to escape from said gap between the inner surface of the bearing housing and said edge of the arcuate portion of the bore insert via said groove.

24. The method according to claim 13, comprising removing an excess amount of the solidified liquid resin after removing the bore insert from the bearing bore so that the bearing bore has the required radius.

25. The method according to claim 13, wherein the bearing housing is part of a wind turbine.

\* \* \* \* \*